May 13, 1969     J. J. FINN     3,444,356
IMMERSION HEATER
Filed Nov. 4, 1966
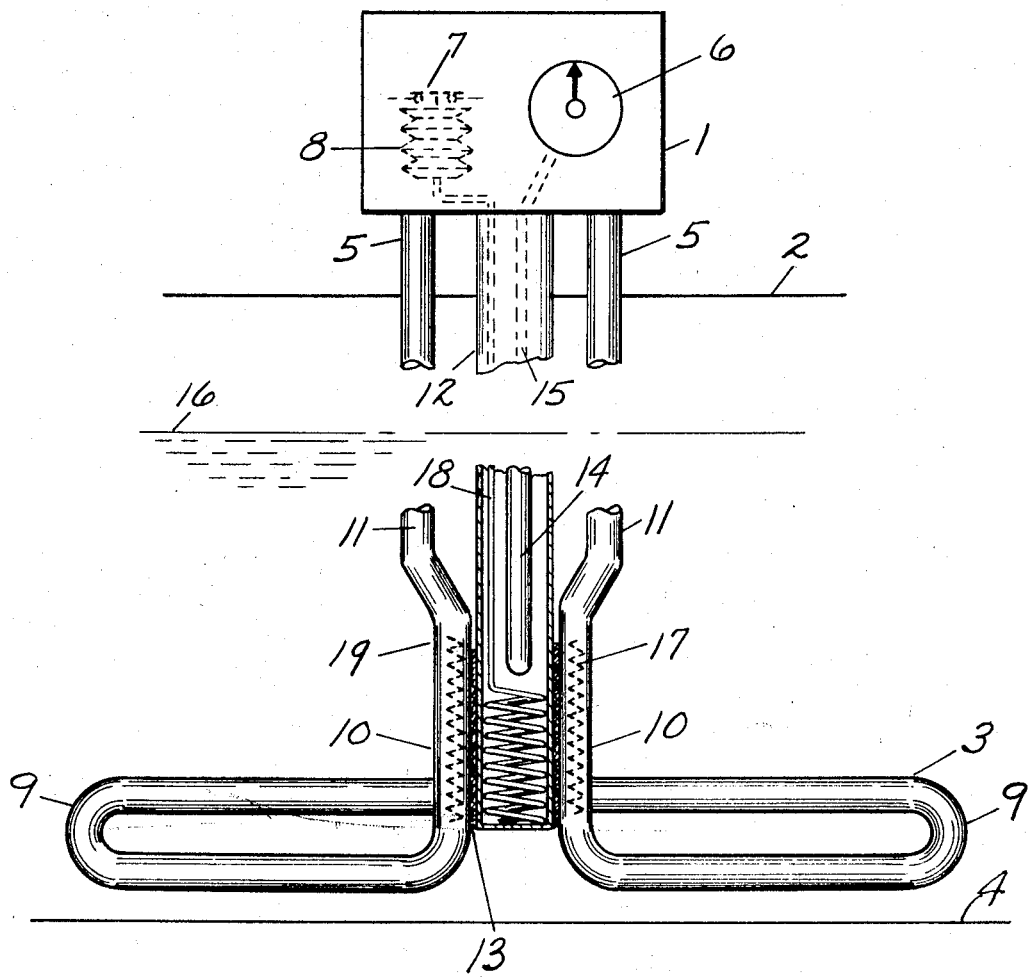
INVENTOR
John J. Finn
BY Ralph Hammar
ATTORNEY

United States Patent Office 3,444,356
Patented May 13, 1969

3,444,356
IMMERSION HEATER
John J. Finn, Erie, Pa., assignor of one-half to Glenn Electric Heater Corporation, Erie, Pa., a corporation of Pennsylvania
Filed Nov. 4, 1966, Ser. No. 592,184
Int. Cl. H05b *3/78*
U.S. Cl. 219—331                                    3 Claims This invention is intended to increase the sensitivity of temperature control of immersion water heaters and at the same time provide better protection against burn out of the heating element due to exposure under low water conditions. This is achieved by the combination of a thermostat having a bulb filled with a low temperature liquid which would vaporize at temperatures slightly above the control range in combination with a capillary tube likewise filled with a low temperature liquid. Both the capillary and the bulb are arranged in a thermowell which is braised or otherwise united to the sheathed heating elements at the uppermost part of the active section so that upon exposure of this section due to low water, the rise in temperature of the exposed section of the heating element is conducted to the capillary, causing its liquid fill to vaporize and open a normally closed switch.

In the drawing, the single figure is a diagrammatic elevation of an immersion heater partly in section.

The heater is frequently used for boosting the water temperature in a restaurant sink, in which case it is mounted so that the control 1 extends above the rim 2 of the sink and the sheathed heating element 3 is adjacent the bottom 4 of the sink. The upper ends 5 of the heating element are secured to the control box 1 which contains the power supply connections, a thermostat 6 controlled by a knob, and an over-temperature cut-off switch 7 controlled by a diaphragm or bellows 8. The active part of the heating element 3 comprises the looped section 9 adjacent the bottom of the sink and upwardly extending sections 10 projecting a short distance above the looped section 9. The sections 9 and 10 have high intensity heating elements which would burn out if the sections 9 and 10 were not immersed. The sections 11 of the heating element extending from the sections 10 up to the control box 1 merely carry the power supply conductors to the high intensity heating elements.

To prevent over heating of the water, a thermowell 12 depends from the control box and houses the temperature sensing elements for the thermostat 6 and for the high temperature cut-off switch 7. The thermowell 12 is tubular and is closed at the bottom. Its lower end extends between sections 10 of the heating element and is braised or otherwise united to these sections at 13 so as to provide good heat contact between the sections 10 and the thermowell. Within the thermowell is a thermostat bulb 14 connected by tubing 15 to the thermostat 6. The thermostat bulb and tubing are filled with a low temperature thermostat liquid which does not vaporize in the low temperature range of from 60° F. to 250° F. This temperature range is sufficiently above the boiling point of the water so that under normal operation, the thermostat 6 is actuated by the expansion of the liquid fill of the bulb 14 to provide the sensitive temperature control inherent in this type of thermostat. The thermostat bulb 14 is arranged below the normal water level indicated by line 16 and preferably above the active heating section of the heating element which starts at point 17. The reason for this is that the bulb 14 is intended to respond to the water temperature under normal conditions when the liquid level is such that the active section of the heating element is submerged. The location of the bulb 14 is not critical because its rate of response is slow compared to the rate of response of the capillary tube 18 also within the thermowell 12 and having its upper end connected to the bellows or diaphragm 8 and having its lower end depending in and arranged in good heat transfer relation to the section of the thermowell opposite the active sections 10 of the heating element. The capillary tube 18 is filled with a low temperature thermostatic liquid the same or equivalent to that filling the bulb 14. The capillary tube is shown coiled in the lower end of the thermowell 12 since that is a convenient way of obtaining good heat transfer. So long as the active sections of the heating element are immersed in the liquid, the capillary 18 and its associated switch 7 have no function. The thermal expansion of the liquid in the capillary is insufficient to operate the switch 7 and the temperature of the liquid is controlled solely by the thermostat 6. However, when the liquid level drops to point 19 and lower, the active section of the heating element becomes exposed and the heat transfer rate drops, causing the temperature of the exposed section of the sheath to rise rapidly. The most severe case is with the sink dry. If the temperature rise of the exposed section were allowed to persist, the heating element would burn out. Upon this rise in temperature, the heat is conducted through the braised or equivalent joints 13 to the thermowell and from there to the capillary tube 18. The temperature rise is substantially in excess of 250° F. and causes local vaporization of the liquid in the capillary tube. This local vaporization produces a tremendous expansion which acts on the bellows or diaphragm 8 and opens the switch 7. This increases in temperature has no effect upon the thermostat bulb 14, either because of the larger mass of liquid in the thermostat bulb 14 or the arrangement of the bulb 14 above the active sections of the heating element or both. If the liquid in the thermostat bulb 14 were vaporized, the vaporizing of the larger mass of liquid in the bulb would break the thermostat 6. The vaporization of a small portion of the liquid in the capillary 18 does not have a similar effect on the diaphragm 8 associated with the switch 7.

As compared to the same heater without the capillary 18 and switch 7 and with the thermostat 6 having its bulb 14 filled with a high temperature thermostat liquid, for example one which would remain liquid at temperatures up to 550° F., the present combination has the advantage of closer control of the water temperature at normal water levels and of quicker cut-off at low water levels. The low temperature liquid thermostat which controls the water temperature at normal water levels will, for example, have a temperature response of ±6° F. When the same thermostat is filled with high temperature thermostatic liquid, its response is ±12° F. When the thermostat 6 has its bulb filled with high temperature liquid, its cut-off in a dry sink takes place in one minute and forty-five seconds. This compares with twenty-eight seconds for the capillary 18 and associated switch 7. These values are by way of example, and not of limitation, and are typical for the same heating element under the same conditions except for the difference in liquid fill of the thermostat 6. By adding the capillary 18 and the associated switch 7 and using the low temperature liquid, the response under low water conditions is so rapid that the temperature of the heating element sheath is kept to such a low value that it is not even discolored.

What is claimed as new is:
1. In an immersion heater for heating liquid having a thermowell with its upper end above the desired normal liquid level and a section at its lower end at and below the minimum liquid level, a sheathed heating element having the greater part of its active length below said minimum liquid level and with a portion of the sheath in its active length extending above said greater part, up to said minimum liquid level and up along and united to the exterior of said section of the thermowell, a thermostat means for controlling the liquid temperature, said thermostat means having a bulb in said thermowell responding to the temperature of the liquid in order to actuate a temperature-controlling switch, said bulb being filled with low temperature liquid which does not vaporize at temperatures in the range of the liquid temperatures controlled by said thermostat means, a capillary in said thermowell filled with a low temperature liquid which does not vaporize at temperatures in the range of the liquid temperatures controlled by the thermostat means and in heat transfer relation to said section of the thermowell whereby upon dropping of the liquid level below said minimum liquid level the temperature of the exposed sheath in the active length of the heating element rises and the rise in temperature of the exposed sheath heats the capillary and vaporizes liquid in said capillary and thereby greatly increases the pressure within the capillary, a normally closed safety cut-off switch for the heating element, and means responsive to the increase in pressure in the capillary due to said vaporization for opening said switch.

2. The heater of claim 1 having in addition a control box and containing the thermostat safety cut-off switch and sealed to the upper end of the thermowell and in which the heating element has extensions of its sheath extending from the upper end of its active length to the control box.

3. The heater of claim 1 in which at least the main portion of said bulb is above said minimum liquid level.

References Cited

UNITED STATES PATENTS

| | | |
|---|---|---|
| 1,930,551 | 10/1933 | Blashfield. |
| 2,576,688 | 11/1951 | Landgraf _____ 219—523 XR |
| 3,061,707 | 10/1962 | Stiebel _____ 219—513 XR |

FOREIGN PATENTS

| | | |
|---|---|---|
| 1,019,922 | 2/1966 | Great Britain. |
| 315,355 | 9/1956 | Switzerland. |

RICHARD M. WOOD, *Primary Examiner.*

ABRAHAM FRANKEL, *Assistant Examiner.*

U.S. Cl. X.R.

122—504; 219—513, 523